US009391414B2

United States Patent
Seals

(10) Patent No.: US 9,391,414 B2
(45) Date of Patent: Jul. 12, 2016

(54) LINE AND LOAD SIDE PHOTOVOLTAIC UTILITY METER ADAPTER (AKA SKY BOX)

(71) Applicants: Rainbow Majestic Seals, Chula Vista, CA (US); Greg Abell, Lakeside, CA (US)

(72) Inventor: Rainbowsky Majestic Seals, Chula Vista, CA (US)

(*) Notice: Subject to any disclaimer, the term of this patent is extended or adjusted under 35 U.S.C. 154(b) by 0 days.

(21) Appl. No.: 14/597,923

(22) Filed: Jan. 15, 2015

(65) Prior Publication Data

US 2015/0255940 A1    Sep. 10, 2015

Related U.S. Application Data

(60) Provisional application No. 61/927,851, filed on Jan. 15, 2014.

(51) Int. Cl.
| | |
|---|---|
| *H01R 13/66* | (2006.01) |
| *H01R 31/06* | (2006.01) |
| *H02S 40/34* | (2014.01) |
| *H01R 13/713* | (2006.01) |
| *H01R 13/68* | (2011.01) |

(52) U.S. Cl.
CPC .............. *H01R 31/065* (2013.01); *H02S 40/34* (2014.12); *H01R 13/68* (2013.01); *H01R 13/713* (2013.01)

(58) Field of Classification Search
CPC ............. H01R 13/6666; H01R 4/2429; H01R 9/2441; H01R 13/713; H01R 23/7068; H01R 13/68; H01H 85/2035; H01H 85/2045; H01H 85/205; H01H 2085/208
USPC ................ 439/620.08, 620.26, 508, 517, 136
See application file for complete search history.

(56) References Cited

U.S. PATENT DOCUMENTS

| | | | | |
|---|---|---|---|---|
| 7,398,944 B2* | 7/2008 | Lewis | ................ | A47K 10/3687 242/563 |
| 7,648,389 B1* | 1/2010 | Scott | .................... | H01R 9/2491 439/517 |
| 7,965,485 B2* | 6/2011 | Mosesian | ............... | H01H 85/12 361/104 |
| 8,454,389 B2* | 6/2013 | Buettner | .............. | H01H 85/203 439/620.26 |
| 8,466,706 B2* | 6/2013 | Ramsey | .................. | H02J 13/00 136/244 |
| 8,674,823 B1* | 3/2014 | Contario | ................... | H02J 1/10 340/333 |
| 8,784,130 B2* | 7/2014 | Scott | .................... | H01R 33/945 439/517 |
| 8,891,211 B2* | 11/2014 | Dent | .................... | G01R 31/405 361/42 |

* cited by examiner

*Primary Examiner* — Abdullah Riyami
*Assistant Examiner* — Vladimir Imas
(74) *Attorney, Agent, or Firm* — Law Office of Scott C Harris, Inc

(57) ABSTRACT

Solar Photovoltaic utility meter adapter is disclosed. The adapter redirects power from a photovoltaic connection directly back to the power grid while still being monitored by the existing utility meter and abiding NEC code rules. This operates to resolve the limitations of busbar amperage rating and heat. The adapter connects to existing electrical connections of an electrical service on a building on one side, and connects to the utility meter on the other side. Busbars inside the adapter receive power from the photovoltaic device, through an overcurrent protecting device. The device is connected in a first configuration with the connection part oriented in a first direction, said busbars connect to load connections of said electrical service, and in a second configuration with said connection part oriented in a second direction opposite to said first direction, said busbars connect to source connections of said electrical service.

8 Claims, 3 Drawing Sheets

LINE AND LOAD SIDE PHOTOVOLTAIC UTILITY METER ADAPTER (AKA SKY BOX)

This application claims priority from provisional application No. 61/927,851, filed Jan. 15, 2014, the entire contents of which are herewith incorporated by reference.

BACKGROUND OF THE INVENTION

A photovoltaic cell converts light, usually sunlight, into electricity. Photovoltaics ("PV"s) are often installed in order to replace or supplement electricity from the electrical grid.

The photovoltaics need to be hooked up to the electric service panel in order to provide power to the load in the house or business; and/or to the power grid. However, a common problem when installing Photovoltaic revolves around the electrical service panel due to busbars that can develop heat issues if excessive electrical loads are connected to the electrical service panel.

The National Electrical Codes also known as the NEC have created installation restrictions for Photovoltaic systems due to these heat issues. NEC states; "Sum of the amps ratings of the overcurrent devices shall not exceed 120 percent of the rating of the busbar or conductor." Due to this NEC code, installers have limited options and typically are forced to increase the main electrical service panel size, reduce the PV system size or other means of sacrifice for PV installation due to the electrical service panel component limitations.

SUMMARY

The present application describes a way of hooking photovoltaics up to the service panel in a way that bypasses the busbars, thus avoiding the need to resize the busbars for the photovoltaic current.

An embodiment describes an interface unit that connects to the service panel and to the photovoltaic device and provides special features, including the ability to connect in multiple different ways.

DETAILED DESCRIPTION OF THE INVENTION

Figure 1:
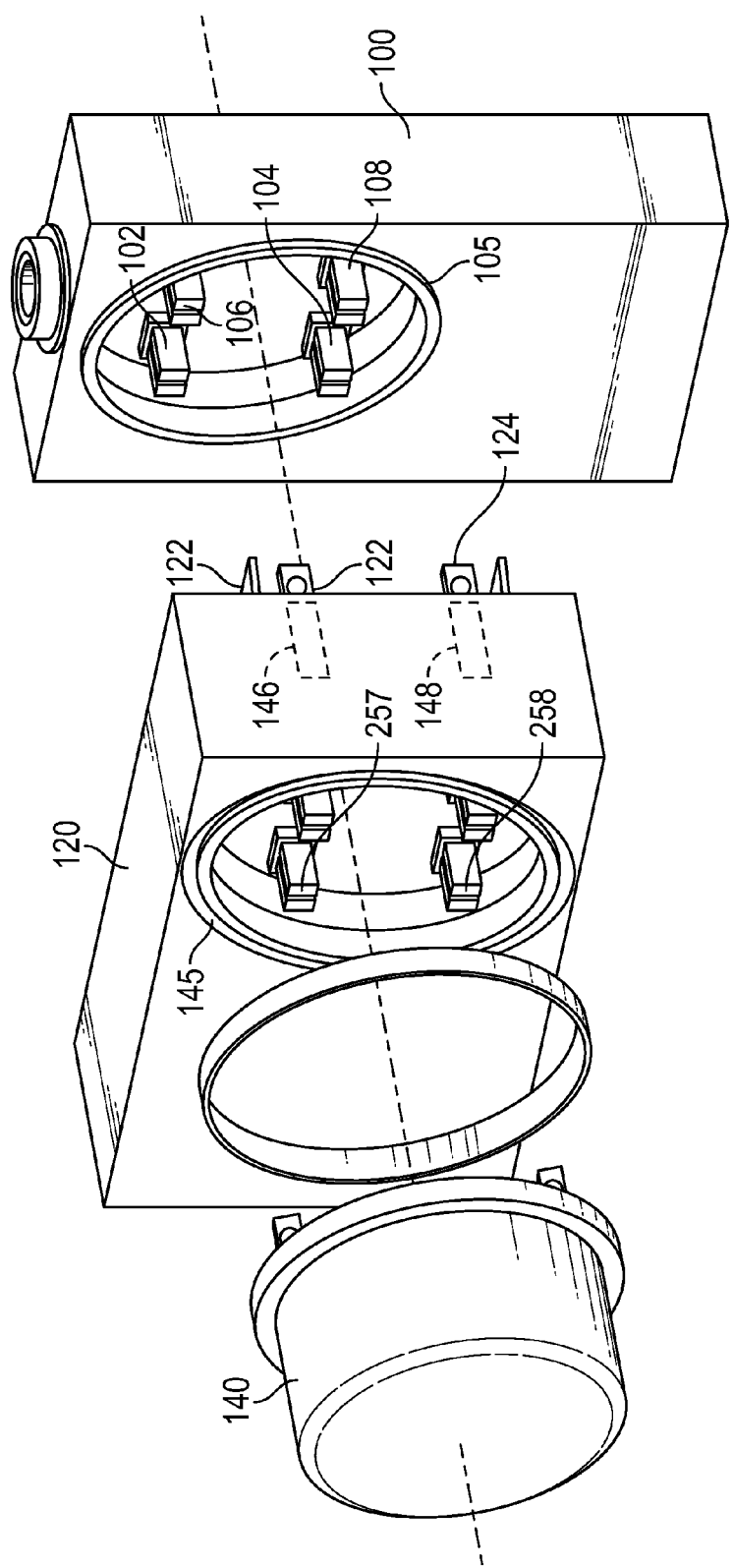
FIG. 1 shows an exploded view showing the interface box, connecting/connectable to the service panel, to the photovoltaic, and to the electrical meter.

An embodiment includes an interface panel including structure to redirect the current from and to the electrical power grid and from the photovoltaics, while still being monitored by both the utility company and the home owner or end user.

Photovoltaic systems are connected at the main electrical service panel. The main electrical service panel is limited by National Electric Code (NEC) rules that states you cannot connect more than 120% of the capacity of the busbars of the main electrical panel. The reason is prevent heat from being created from the electrical load usage creates heat on the busbars. Applying this NEC rule creates enormous restrictions and limitations for PV installers, engineers and end users.

Incoming utility service conductors that supply the main electric service panel are rated for one hundred percent of their demand, while a main electrical service panel is often rated for a fraction of the same amperage. All the electrical loads are combined at the main electrical panel limits, and this can overload the busbar amperage capacity by generating too much heat.

The interface panel, referred to herein as a Sky Box utility meter adapter, allows the installer to meet all the NEC code requirements and eliminate the problem of the amperage load limitations of the main electrical service panel busbars due to heat and amperage limitations. The Sky Box adapter connects the flow of electricity from the PV source, to bypass the main service busbar altogether; and be redirected back to the service utility conductors (or direct to the load connections of the service panel), while still being monitored by the utility company and utilized by the PV system owner.

By bypassing the weakest components that have heat restriction due to electrical loads, the utility adapter operates to eliminate typical system size limitations. Having the option to utilize utility conductors that come to each service panel and are rated 100% of the capacity rating of that service panel can eliminate heat restrictions due to the ability to return the full load capacity back through utility conductors to the grid.

Other applications for the Sky Box include but are but not limited to; charging stations, service back feed issues, Photovoltaic amperage restrictions, heated service busbars, electric loads being back fed to main service panel or to grid.

The purpose of this device is to utilize the full potential of the utility entrance service conductors without having to do a service upgrade or reduce the Photovoltaic system size or other restrictiveness. By creating a means to connect on either the line or load-side of the incoming utility (depending on whether you have a Virtual Net Meter or Net meter) with one enclosed pre-manufactured adapter and still provide a means for metering through the utility meter and maintaining overcurrent protection per NEC, this addresses photovoltaic installation heating and amperage limitation problems. NEC rules will not apply as it will not be causing service panel capacity issues as the utility conductors are sized to deliver and receive 100 percent of the service panel amperage with no restrictions. Instead of the standard PV interconnection means, the PV meter adapter component snaps directly onto the face of the main service panel once the existing meter is removed. The existing meter then snaps into the meter location of the Sky Box.

The Sky Box uses busbars such as 210, 212 that are rated for the full amperage capacity of each individual main service panel and incoming conductors. The line and/or load busbars are components of each PV meter adapter and travel back the distance to each overcurrent device 224 that has the option to install suitable size overcurrent according to the engineered PV rating. Incoming PV conductors 230 are then connected to the overcurrent protection by lugs that will allow the system to be completely code compliant.

Figure 3:
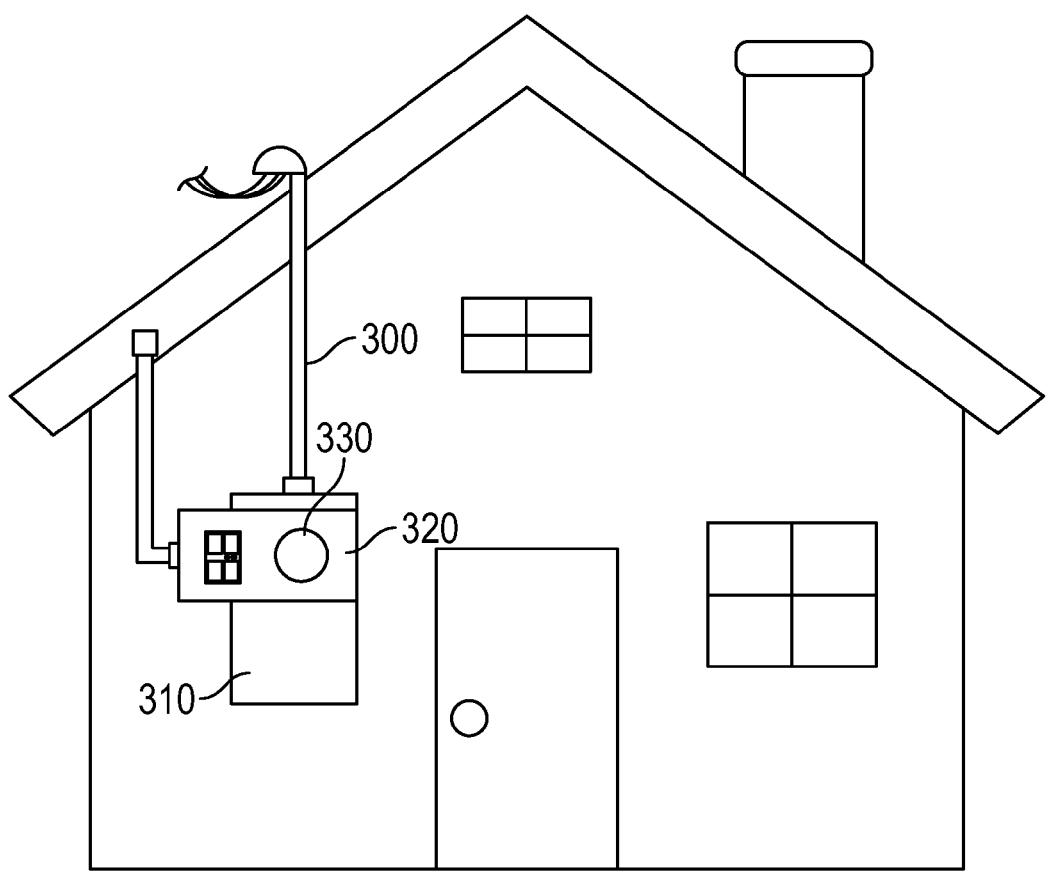
FIG. 3 shows the connection to the service panel on a location.

The enclosure houses the components from the elements and for safety and is slightly wider than the utility meter itself as shown in FIG. 3. The back of the enclosure has pre-manufactured male tabs (122, 124) that are long enough to penetrate the female slots (102, 104) of the existing main service panel meter utility location.

The front of the enclosure has the round meter opening and ring with jaw 145 for the proper installation of existing meter, appropriately rated optionally reversible Busbars that are reversible for load side and line side as to not interfere with the function of the utility meter. These busbars conduct between the load side of the utility meter and the load side of the overcurrent protection device frame in one embodiment.

There is a separation by a division to isolate utility meter and the Photovoltaic connection side. This barrier is for the safety of the installer, to prevent their contact with the utility side of the meter.

Busbars can be placed in either the line or load positions of the meter for a Virtual Net Meter or a Net Meter.

The overcurrent protection device has the option for installation of the appropriate size overcurrent protection device 224. Overcurrent protection frame allows Photovoltaics to be sized properly for each individual PV system size. An overcurrent device frame allows the installer a hassle free means of completing the closure of the circuit back to the utility grid with either a line side or load side interconnection and maintain a safe, code compliant PV installation with no load or heat restrictions.

FIG. 1 illustrates the embodiment and how to make and use that embodiment.

A pre-manufactured enclosure roughly 11" by 24" by 6", with space for male tabs in the rear, with 16 gauge galvanized powder coated Lt. gray frame is used in this embodiment to house appropriately sized busbars that are switchable as to not interfere with function of the utility meter. In FIG. 1, the existing utility housing 100 has standard clips 102, 104 that normally connect to the utility meter. The existing housing 100 also defines a substantially round outer perimeter 105 which usually connects to the inside surfaces of the utility meter.

The utility housing 100 connects in this embodiment to an overcurrent protection frame 120 which has tabs 122, 124 which connect respectively to the clips 100 102 that normally connect to the utility meter. The protection frame 120 also includes a round portion adapted for connection to a flange on the housing 100 for the electrical service that normally houses the electrical meter.

The overcurrent protection frame 120 also has busbars that connect back to the load side 220, 222 of the overcurrent device 224 (shown as a circuit breaker, but can also be a fuse or other overcurrent device). The overcurrent device 224 receives power 230 from the PV device.

Meter socket locations and overcurrent frame are isolated from each other and sealed as to not allow easy access to the meter locations once installed.

The overcurrent protection enclosure 120 has knockout locations 146, 148 on top, bottom and side close to breaker frame so it can easily be flipped from left to right for different positions and different conduit entrance options. Knockout location for penetration for PhotoVoltaic conductors should be closest to overcurrent protection side of enclosure and weatherproof. So for example, the unit can be installed in the direction shown in FIGS. 1 and 2, with the clips 126, 128 connected to the corresponding load side clips on the house meter. This connects the photovoltaic system directly to the load, for use in metering applications where the power is coupled directly to the load. Analogously, the enclosure can be turned upside down, so that the connection clips 126, 128 connected to the source side clips 106, 108, for applications where the power is sent directly to the utility company. In all of these situations, the user can install their own overcurrent device 224, and busbars of any desired size.

Note that the bolts such as 255, 256 can be connected to hold the corresponding clips 257, 258 to which the existing meter 140 connects.

The Photo Voltaic utility meter adapter 120 is used when main service panel is not suitable for backfeed PV amperage rating, if installing a Virtual Net Meter installation or if you have more Photovoltaic amperage than what the mainservice panel is capable of handling for the busbar rating.

In operation, after receiving appropriate permission from local authority having jurisdiction utility meter must be removed. Then, the Photovoltaic utility meter adaptor is put into place of existing utility meter and secured.

Figure 2:
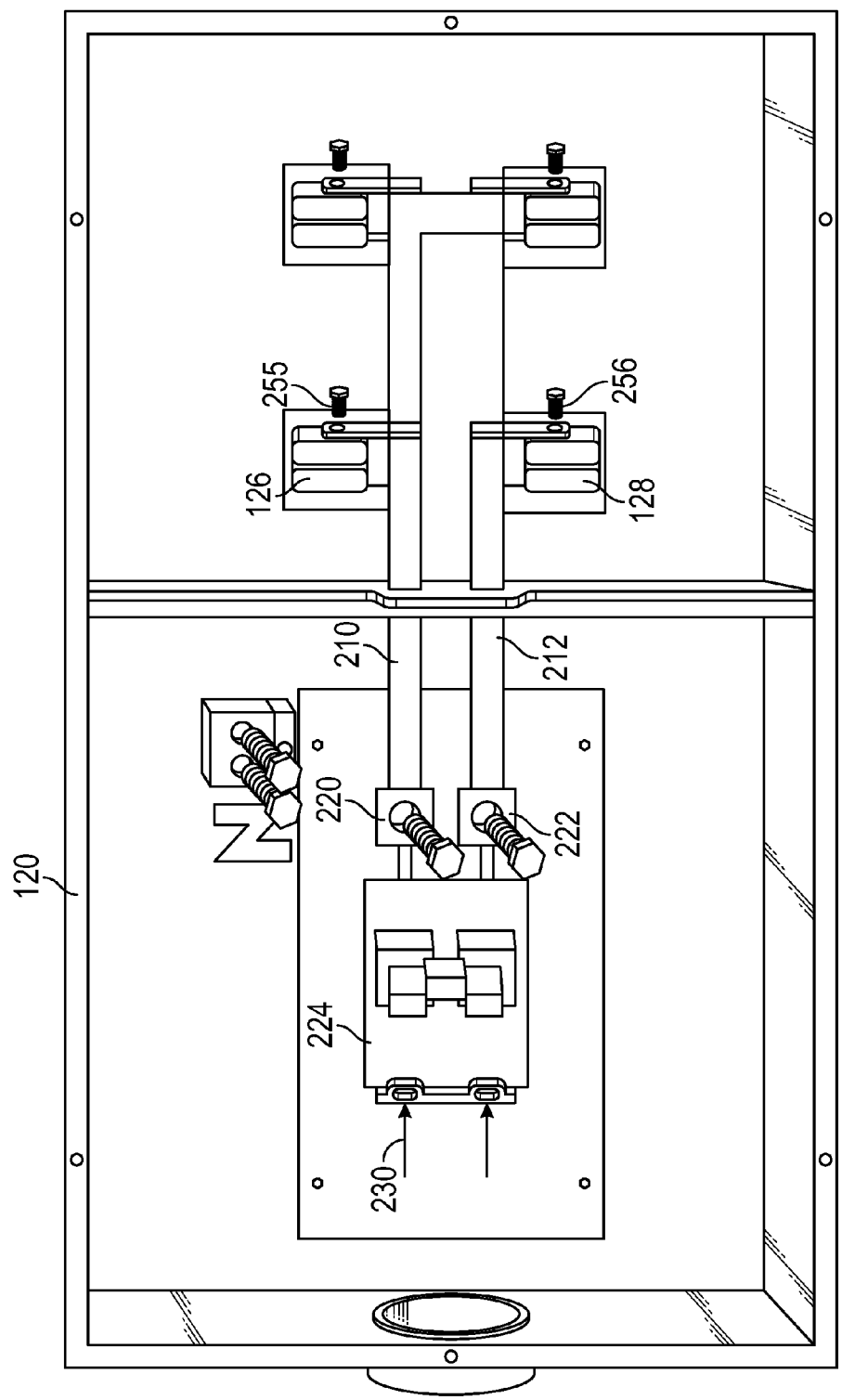
FIG. 2 shows an internal view of the interface box, and its busbars.

FIG. 2 shows a diagram of the inside of the overcurrent enclosure 120. The tabs 126, 128 connect to respective busbars to 10, 212 which are connected via switches 220, 222 to a breaker assembly 224 which connects to the photovoltaic system 230. The overcurrent device 210, 212 of an appropriate size overcurrent is installed in frame enclosure 120.

The meter 140 connects to a flanged 145 of a similar size to that flange 105 that exists on the existing electrical connection.

FIG. 3 shows the hookup attached to a housing, where the existing electrical 300 comes into the electrical connection box 310, the interface and overcurrent 320 is connected to that, and the meter goes on the interface and overcurrent device.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, Additionally: It could be used for other electrical loads that are not necessarily used in installing Photovoltiac but have similar restrictions with the main electrical service panel load limitations such as car charging stations.

Also, it can eliminate the need for service panel upgrades for other electric loads being back fed to main service panel, system reduction or other means of sacrifice due to heat or amperage limitations for PV system engineer, installer or owner.

This device is also to be used in a Virtual Net Metering application for multi-family housing that is having solar installed, with the aid of this Virtual Net & load side Photovoltaic utility meter adapter AKA Sky Box the MSB (Main Switch Board) meter will have the ability to install an unlimited amount of amperage to one interconnection point.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An interface device comprising:
a first connection part, on a back portion of the interface device, and sized for connecting to existing electrical connections of an electrical service on a building;
said first connection part also connected to a second connection part, on a front portion of the interface device, said second connection part for connecting to an electrical meter,
at least two busbars, said first and second connection parts also receiving a connection from said at least two busbars;
an overcurrent protecting device, having a source side adapted for connection to a photovoltaic source, and having a load side connected to said busbars,
wherein said busbars connect between the load side of said overcurrent device, and to said electrical connections of said electrical service;
where in a first configuration with the connection part oriented in a first direction, said busbars connect to load connections of said electrical service, and in a second configuration with said connection part oriented in a second direction opposite to said first direction, said busbars connect to source connections of said electrical service.

2. The device as in claim 1, wherein said overcurrent device is a circuit breaker.

3. The device as in claim 1, wherein said interface device has a housing that is rectangular, and wider in width than a housing for said electrical service, and where the connection is placed on a first side to be connected to the load connection and on a second side to be connected to the source connection.

4. The device as in claim 3, wherein said housing also includes a round flange adapted for connection to an electrical meter.

5. The device as in claim 4, wherein that said connection part includes a round connection which connects to a flange that is intended for connection to the electrical meter, on said electrical connection.

6. The device as in claim 5, wherein said first connection part includes first and second tabs on the back portion of said first connection part, which connect to corresponding clips on the electrical connection.

7. The device as in claim 6, further comprising clips on the front portion of said connection part, inside a round area defined by said flange, and adapted to connect to the electrical meter.

8. The device as in claim 1, wherein said overcurrent device is a fuse.

* * * * *